United States Patent
Magnuson et al.

(10) Patent No.: US 8,180,027 B1
(45) Date of Patent: May 15, 2012

(54) SCORE-DRIVEN MANAGEMENT OF RECORDINGS

(75) Inventors: James E. Magnuson, Irving, TX (US); John S. Hogg, Jr., Bedford, TX (US)

(73) Assignee: Securus Technologies, Inc., Dallas, TX (US)

( * ) Notice: Subject to any disclaimer, the term of this patent is extended or adjusted under 35 U.S.C. 154(b) by 1415 days.

(21) Appl. No.: 11/603,922

(22) Filed: Nov. 22, 2006

(51) Int. Cl.
*H04M 1/64* (2006.01)

(52) U.S. Cl. ............... 379/88.22; 370/352; 379/88.08; 379/93.01; 379/201.01; 379/202.01; 379/207.01; 455/414.1; 709/202; 709/224

(58) Field of Classification Search .......... 370/259–271, 370/351–356; 348/14.01–14.16; 379/37–51, 379/67.1–88.28, 93.01–93.04, 111–112.04, 379/133, 142.15, 201.01, 201.02, 202.01, 379/207.01, 210.02–218.02, 221.08, 221.09; 709/201–207, 217–244
See application file for complete search history.

(56) References Cited

U.S. PATENT DOCUMENTS

| | | | | |
|---|---|---|---|---|
| 4,982,420 | A * | 1/1991 | Theis | 379/68 |
| 5,832,068 | A * | 11/1998 | Smith | 379/114.14 |
| 6,122,357 | A * | 9/2000 | Farris et al. | 379/207.02 |
| 6,286,005 | B1 * | 9/2001 | Cannon | 455/2.01 |
| 6,647,096 | B1 | 11/2003 | Milliorn et al. | |
| 6,665,376 | B1 * | 12/2003 | Brown | 379/85 |
| 6,839,850 | B1 * | 1/2005 | Campbell et al. | 726/23 |
| 6,871,229 | B2 * | 3/2005 | Nisani et al. | 709/224 |
| 7,035,386 | B1 * | 4/2006 | Susen et al. | 379/93.02 |
| 7,058,163 | B1 | 6/2006 | Parekh et al. | |
| 7,079,637 | B1 | 7/2006 | McNitt et al. | |
| 7,653,188 | B2 * | 1/2010 | Kloberdans et al. | 379/145 |
| 7,664,794 | B2 * | 2/2010 | Kasmirsky et al. | 707/640 |
| 2002/0106070 | A1 * | 8/2002 | Elsey et al. | 379/218.01 |
| 2002/0120765 | A1 * | 8/2002 | Boehmke | 709/231 |
| 2003/0041048 | A1 * | 2/2003 | Balasuriya | 707/1 |
| 2003/0069952 | A1 * | 4/2003 | Tams et al. | 709/223 |
| 2003/0174829 | A1 * | 9/2003 | Dezonno et al. | 379/265.02 |
| 2004/0203621 | A1 * | 10/2004 | Brown et al. | 455/412.1 |
| 2005/0240656 | A1 * | 10/2005 | Blair | 709/213 |
| 2006/0252376 | A1 * | 11/2006 | Fok et al. | 455/67.13 |
| 2007/0133437 | A1 * | 6/2007 | Wengrovitz et al. | 370/260 |

OTHER PUBLICATIONS

U.S. Appl. No. 10/135,878, filed Apr. 29, 2002.
U.S. Appl. No. 10/720,848, filed Nov. 24, 2003.
U.S. Appl. No. 11/334,522, filed Nov. 8, 2006.
U.S. Appl. No. 11/603,923, filed Oct. 22, 2006.
U.S. Appl. No. 11/603,938, filed Nov. 22, 2006.
U.S. Appl. No. 11/603,960, filed Nov. 22, 2006.

* cited by examiner

*Primary Examiner* — Hemant Patel
(74) *Attorney, Agent, or Firm* — Fogarty, L.L.C.

(57) ABSTRACT

Systems and methods are provided for score-driven management of such recordings. A score is assigned to a recording based at least in part on a plurality of monitored events that are detected for the call being recorded, and such score is then used for managing the recording, such as managing storage and/or post-processing of the recording. A recording manager is provided, which is operable to perform score-driven management of a recording. According to one embodiment, an initial score is determined for a recording at the initiation of the call being recorded. Such initial score may be determined based on fixed factors that are known at the time of the call's initiation. Various events related to the call are monitored during the call, and the score is then revised based on detected events. Management of storage, post-processing, and/or other handling of the recording is then based on the score assigned thereto.

52 Claims, 7 Drawing Sheets

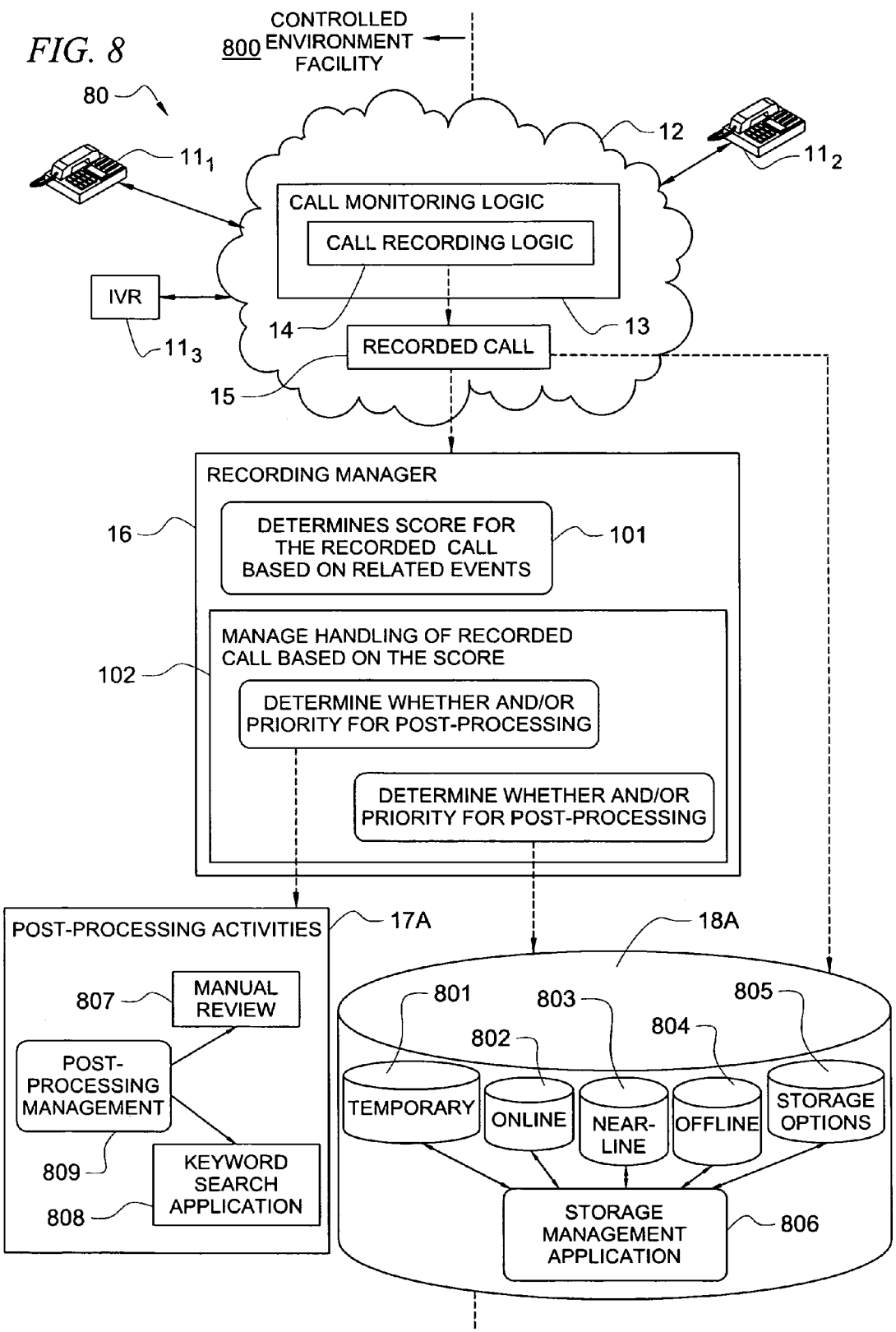

SCORE-DRIVEN MANAGEMENT OF RECORDINGS

CROSS-REFERENCE TO RELATED APPLICATIONS

This application is related to commonly assigned and concurrently filed U.S. patent application Ser. No. 11/603,960, titled "SYSTEMS AND METHODS FOR DETECTING A CALL ANOMALY USING BIOMETRIC IDENTIFICATION", Ser. No. 11/603,938 titled "SYSTEM AND METHOD FOR MULTI-CHANNEL RECORDING", and Ser. No. 11/603,923 titled "PROTECTED DATA CONTAINER FOR STORING DATA RELATING TO RECORDED CALLS IN A MANNER THAT ENABLES THE DATA TO BE AUTHENTICATED"; co-pending and commonly assigned U.S. patent application Ser. No. 10/135,878, filed Apr. 29, 2002 titled "INFORMATION MANAGEMENT AND MOVE SYSTEM AND METHOD"; Ser. No. 10/720,848, filed Nov. 24, 2003 titled "INFORMATION MANAGEMENT AND MOVE SYSTEM AND METHOD", Ser. No. 10/420,585, filed Apr. 22, 2003 titled "SYSTEM AND METHOD FOR DETECTING UNAUTHORIZED CALL ACTIVITY"; Ser. No. 11/334,552, filed Jan. 18, 2006 titled "SYSTEM AND METHOD FOR KEYWORD DETECTION IN A CONTROLLED ENVIRONMENT FACILITY USING A HYBRID APPLICATION"; and U.S. Pat. No. 7,058,163 titled "SYSTEM AND METHOD FOR EX POST FACTO PRESERVING A RECORDED CONVERSATION", the disclosures of which are hereby incorporated herein by reference.

TECHNICAL FIELD

The following description relates generally to management of recordings of calls, and more particularly to systems and methods for score-driven management of such recordings, wherein a score is assigned to a recording based at least in part on a plurality of monitored events that are detected for the call being recorded.

BACKGROUND OF THE INVENTION

Correctional facilities have traditionally recorded telephone conversations of its inmates. Such recordings may be conducted pursuant to a variety of rules that range anywhere from only recording conversations of calls made to specific telephone numbers, calls made by specific inmates or made using specific telephones, to recording every single call. Various techniques for recording telephone calls are known. Examples of known recording techniques include those described in U.S. Pat. No. 6,647,096 titled "SYSTEM AND METHOD FOR REMOTELY CONTROLLING AUTOMATED CALL PLACEMENT CALL MONITORING FUNCTIONS," U.S. Pat. No. 6,665,376 titled "SELECTIVELY ACTIVATED INTEGRATED REAL-TIME RECORDING OF TELEPHONE CONVERSATIONS WITH AUTOMATED DOCUMENTATION OF CONSENT TO CALL RECORDING," and those described in U.S. Pat. No. 7,058,163, entitled "SYSTEM AND METHOD FOR EX POST FACTO PRESERVING A RECORDED CONVERSATION", the disclosures of which are hereby incorporated herein by reference.

Some audio recordings are made on wire susceptible to magnetization or on magnetic tape. Audio recordings are also made by passing the audio through an analog-to-digital converter (ADC) and by storing digital data in a digital storage medium such as a magnetic hard disk, a semiconductor memory, or optical or magneto-optical storage such as a writable CD-ROM. Further, in certain instances, the audio is communicated in digital form over a communication network (e.g., as with Voice over IP (VOIP)), wherein the digital audio may be captured and stored to a digital storage medium.

Thus, recording of inmate telephone calls is well known. Such recordings may be monitored by appropriate authorities to detect information regarding the security of facilities, continuing or past criminal activity, etc. Monitoring of the recordings may be performed manually (e.g., by a person listening to the recording) and/or may be performed robotically (or autonomously) by, for example, computer processing logic for analyzing the recordings for certain keywords, etc. In some instances, the recordings may be stored for later use, such as for later investigations, later used as evidence in a court of law, etc.

As the number of recordings increases, difficulty arises in managing such recordings. Various management issues are present. One management issue is deciding how best to store the recordings (e.g., whether to store in on-line storage or store to off-line storage). Generally, in a multi-stage storage system, various stages of storage are available, such as immediate (or temporary) storage which is typically used as the recording is being captured, online storage, near-line storage, and offline storage, as examples. These various stages of storage are well known in the art and are thus not described in detail herein so as not to unnecessarily obscure details of the inventive concepts presented herein. It should be recognized that generally each of these stages of storage successively take longer to retrieve data therefrom, but are each successively less expensive. For instance, a recording can be retrieved much more quickly from online storage than from offline storage, but generally online storage is more expensive than offline storage. Accordingly, a desire arises to manage to which type of storage a recording should be stored and for how long. Thus, when managing storage of captured recordings, a determination is to be made regarding where and for how long to store recordings.

Another management issue that arises is deciding whether to process a given recording, such as by having a user listen manually to the recording and/or have the recording processed by a keyword detection application. Such processing is typically referred to as "post-processing" of the recording because the processing is generally performed after the recording of the call is captured. While certain processing may be performed live during a call (e.g., eavesdropping on live communication), often the calls are recorded for later processing. Of course, certain processing may occur on captured portions of a recorded call while the call is going on, and thus processing of a recording need not be delayed until after a call is fully completed (although, very often due in part to the volume of calls and limited processing resources available, the calls are fully completed and recordings are stored for some period of time before processing). A related management issue involves prioritizing the recordings that are to be processed to, for instance, determine the order in which the recordings are to be processed. As the number of recordings increase, it becomes desirable to manage the post-processing of such recordings to ensure proper utilization of the limited processing resources that are available. Thus, it becomes desirable to determine which recordings to perform post-processing on, what type of post-processing to perform on a given recording, and the relative priority of the desired post-processing of the captured recordings.

As mentioned above, correctional facilities (local, state and federal) have traditionally recorded telephone conversations for investigations with a variety of rules that range anywhere from only recording specific numbers, inmates or phones up to recording every single call including visitation. A variety of factors have resulted in a dramatic increase in the number of recorded calls, including the recording technology becoming more ubiquitous, the cost for storage steadily declining, and the Department of Homeland Security requiring more recording. Thus, an increasing number of recordings are required to be managed. A significant number of recordings are not reviewed until some point in the future when an event happens that causes a review, and as a result there are requirements to store the recordings that range from, say, 90 days to 5 years. This increased usage and longevity has, in part, resulted in a desire to both (a) filter recordings that may be more urgent to review (i.e., better prioritize recordings that should receive more urgent attention), and (b) better manage how recordings are stored for immediate or delayed retrieval.

BRIEF SUMMARY OF THE INVENTION

The present invention is directed generally to management of recordings of calls, and more particularly to systems and methods for score-driven management of such recordings. According to embodiments of the present invention, a score is assigned to a recording based at least in part on a plurality of monitored events that are detected for the call being recorded, and such score is then used for managing the recording, such as managing storage and/or post-processing of the recording.

As mentioned above, communications (e.g., telephone calls) are often recorded, particularly in controlled-environment facilities, such as correctional facilities. Thus, a desire arises for managing the recordings of calls, such as managing storage and/or post-processing of the recordings. For instance, once a call is recorded, one must determine what to do with the resulting recording, e.g., where and for how long to store the recording, whether to perform any post-processing activities on the recording and if so, what is the priority of performing such post-processing activities for this recording as compared to other recordings that are to also be processed.

According to embodiments of the present invention, a recording manager is provided, which is operable to perform score-driven management of a recording. More specifically, such recording manager is operable to determine a score for the recorded call based on call-related events detected for the call. For instance, as described further herein, in certain embodiments a plurality of call-related events may be taken into consideration in computing a score for the recorded call. For example, the detection of certain call-related events may increase the score, while the detection of other call-related events may decrease the score; and the resulting final score computed as a result of the various events taken into consideration is utilized for managing the recording. In certain embodiments, a user (e.g., controlled-environment facility administrator) can select the call-related events to be considered in computing the score, as well as specify a corresponding impact (e.g., an amount of increase or amount of decrease in value) that each selected call-related event is to have on the computation of the score.

The computed score assigned to a recording based on the various detected events for the recorded call is then used for managing handling of the recording. For instance, a storage management application may manage storage of the recording (e.g., selecting where and for how long to store the recording) based on the assigned score. Further, a post-processing management application may manage post-processing of the recording (e.g., selecting which post-processing activities to perform and a prioritization of performance of such post-processing for this recording versus other recordings) based on the assigned score.

According to one embodiment, an initial score (e.g., for determining processing priority, etc.) is determined for a recording at the initiation of the call being recorded. Such initial score may be determined based on fixed factors that are known at the time of the call's initiation, such as based on an identification of a particular controlled-environment facility from which the call is being placed and/or based on a contract that such facility has with a telephone service provider, as examples. Various events related to the call are monitored during the call, and the score is then revised based on detected events. For instance, in one embodiment, a delta value to be applied to the initial score is determined based on various monitored events that are detected during the call. Examples of such events that may be monitored and used for computing such a delta include, without limitation, the following: a) identification of an individual port for the call, b) identification of a port group for the call, c) the call's destination number, d) various attributes of the destination number, such as class (e.g., residential, business, cellular), call type (e.g., local, intra, inter, international), call forwarding, e) identification of the caller (e.g., a PIN of a resident of a controlled-environment facility, such as an inmate of a correctional facility), f) Resident's Attributes, including as examples classification (e.g., level of incarceration of an inmate, such as minimum security, medium security, or maximum security), classification details for the resident, known affiliations of the resident, allowed/authorized number list for the resident, g) time of day that the call is placed, h) events occurring during the call, including as examples attempts at 3-Way/Multi-party calls, a change in the number of unique voices participating on the call being detected, duration of the call, specific words detected during the call, language spoken by one or more parties to the call, manual flagging of the call as being of interest by someone listening to the call (e.g., an eavesdropper), audit events during the call (e.g., by an eavesdropper to the call), etc. There may be audit events generated against a recording after the recording is complete, from investigators, computer-executable post-processing applications, etc., which may in certain embodiments result in a revision of the score assigned to such recording.

Thus, certain embodiments provide a method for assigning a priority to a recording based on an initial priority and a re-assignment or delta value depending on call-related events, such as events relating to a given contract, site, destination number, inmate, events during the call and other sources of attributes including a method of defining how long to keep recordings in each stage of a multi-stage storage system.

Recording storage is often partitioned into multiple stages, typically as: a) temporary (e.g., while the recording is occurring), b) online, c) near-line, d) offline, and e) purged, as examples. Various other stages of storage may be available in addition to or instead of these exemplary stages. Each stage of storage may have its own characteristics that differ from the other stages. For instance, generally in a multi-stage storage system the retrieval time decreases successively from one stage to the next (e.g., online permits faster retrieval than offline, etc.), and cost of storage decreases successively from one stage to the next. Thus, it becomes desirable to manage utilization of the available storage in each stage effectively for recordings.

In certain embodiments, a rules table is provided that defines, based on a score assigned to a recording (e.g., based on an effective priority and processing activities to be performed, etc. for the respective assigned score), how long a recording will remain in each storage partition (or "stage"). A similar rules table may be utilized to manage post-processing activities that are to be performed on the recording based on its assigned score. The table(s) may be unique by contract and/or facility. That is, a given controlled-environment facility may, for example, define their own tables to manage recordings in the manner that is desired by that specific facility. In certain embodiments, the scoring system may be used for a plurality of different controlled-environment facilities, and each facility can define their respective tables so as to control their management of recordings in the manner that they see fit. In certain embodiments, a process (e.g., storage management application) may automatically move a recording from one storage partition (or "stage") to the next based on the assigned score (taking into consideration such factors as the recording's age, effective priority, and the appropriate rules table, as examples).

Embodiments of the present invention have particular applicability within controlled-environment facilities for recording calls between a resident and other parties. Examples of controlled-environment facilities include correctional facilities (e.g., municipal jails, county jails, state prisons, federal prisons, military stockades, juvenile facilities, detention camps, and home incarceration environments), healthcare facilities (e.g., hospitals, nursing homes, mental health facilities, and rehabilitation facilities, such as drug and alcohol rehabilitation facilities), restricted living quarters (e.g., hotels, resorts, camps, dormitories, and barracks), and the like. Certain controlled-environment facilities may be thought of as a small community or city, perhaps walled or otherwise access restricted, wherein various activities occur within the community and between the community and those outside the community in the daily operation thereof. Such a community may include a number of individuals and enterprises directly associated therewith, including management, staff, and inmates, residents, patients, or guests (herein referred to as "residents"), and a number of individuals and enterprises indirectly associated therewith, including friends and family of residents, vendors, government agencies, providers of services to residents, and individuals with a connection to the facility or its residents. Of course, as those of ordinary skill in the art will recognize, while embodiments the present invention have particular applicability to controlled-environment facilities (because such facilities often have a desire to record calls), the concepts disclosed herein may likewise be employed in other environments.

Embodiments of the present invention can be applied for managing recordings of various types of calls. As used herein, except where accompanying language expressly specifies otherwise, a "call" is intended to broadly refer to any communication between two or more parties which can be recorded. Thus, a "call" is not limited to telephony calls, but also encompasses various other types of communication. In certain embodiments of the present invention, the call being recorded is substantially a real-time communication between the parties (e.g., as in telephony calls). Further, a telephony call is not limited to calls that are transmitted over a public-switched telephone network, but rather a telephony call may refer to a voice call carried in whole or in part over a packet-switched network, such as a voice-over-IP (VoIP) call, a call conducted locally within a facility (e.g., as with known visitation telephones commonly used in correctional facilities), etc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 8 shows an exemplary system according to one embodiment of the present invention, wherein a score-driven management technique is employed for managing recordings of calls for a controlled-environment facility.

DETAILED DESCRIPTION OF THE INVENTION

Figure 1:
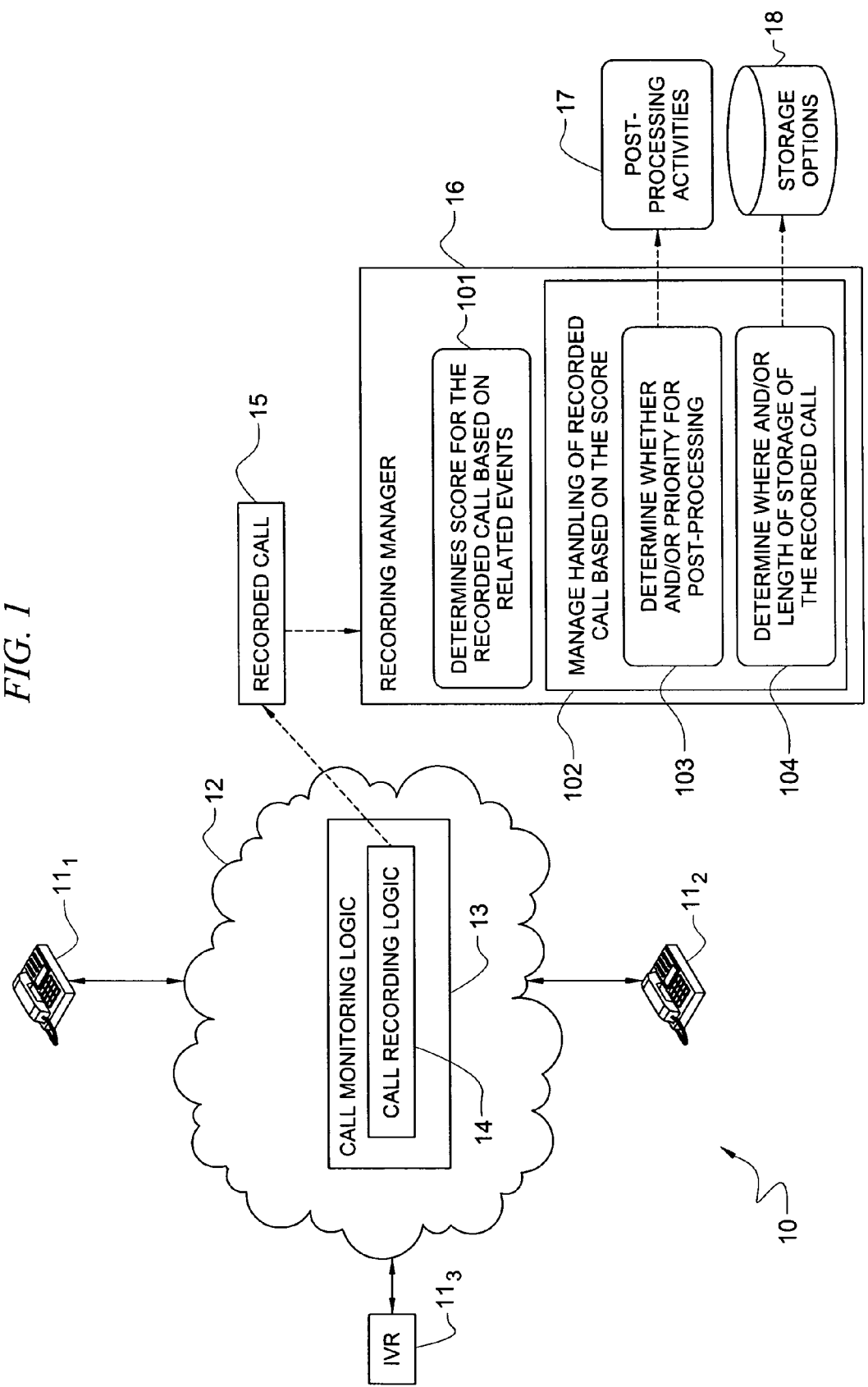
FIG. 1 shows an exemplary system according to one embodiment of the present invention.

FIG. 1 shows an exemplary system 10 according to one embodiment of the present invention. System 10 comprises a first communication device $11_1$ and a second communication device $11_2$, which are operable to communicate with each other. In this example, first and second communication devices $11_1$ and $11_2$ are shown as telephones; although as discussed further herein, embodiments of the present invention are not limited in application to telephony communication devices. For instance, communication devices $11_1$ and $11_2$ may be any communication devices that enable users thereof to communicate with each other. In the example of FIG. 1, a further communication device $11_3$ is an interactive voice response (IVR) unit that may participate on a call. Thus, various parties may participate on a call via communication devices $11_1$-$11_3$ (note that IVR $11_3$ is considered a party to the call). While an IVR is shown in this example, such an IVR $11_3$ need not be included in all embodiments and/or may not participate on all calls. Further, in certain embodiments, additional communication devices may be included (e.g., to enable more parties to participate on a given call). Thus, while a total of three communication devices $11_1$-$11_3$ are shown for simplicity in this example for participating on a call, any number of communication devices may participate during a given call in certain embodiments, and embodiments of the present invention are not limited as to the number of communication devices that may be participating on a call.

The communication devices $11_1$-$11_3$ are communicatively coupled via communication network 12 over which communication of a call is transmitted, such as a public-switched telephone network (PSTN), packet-switched network (e.g., the Internet), a wireless network, etc. Communication network 12 may include (e.g., have communicatively coupled thereto) logic to perform various types of processing on a call, including billing the call, performing checks to ensure that the call is authorized (e.g., in the context of a correctional facility, an inmate may not be authorized to place certain calls, such as calls to judges, victims, etc.), monitoring for unauthorized events during the call (e.g., in certain environments, such as in correctional facilities, certain enhanced telephony activities such as three-way calling are not permitted), etc. In the exemplary system 10 of FIG. 1, such call processing logic includes call monitoring logic 13 for capturing various data relating to a call. For instance, in this example logic 13 includes a call recording system 14. In certain embodiments, the call may be recorded using a multi-channel recording technique such as that described further in currently filed and commonly assigned U.S. patent application Ser. No. 11/603,938 titled "SYSTEM AND METHOD FOR MULTI-CHANNEL RECORDING", the disclosure of which is hereby incorporated herein by reference. Of course, other recording techniques now known or later developed may be used in other embodiments.

Call monitoring logic 13 may also include various other monitoring logic for capturing information relating to a call, such as detecting unauthorized call activity (e.g., calls to unauthorized numbers, attempted three-way calls, etc.), detecting the identity of one or more parties to a call (e.g., detecting the identity of a resident of a controlled-environment facility whom is placing the call via, for instance, voice recognition and/or a personal identification number (PIN) input by the resident), detecting a destination number to which the call is directed, detecting from which communication device (e.g., from which telephone) within a controlled-environment facility a call is placed, detecting on which port of the controlled-environment facility's telephone system the call is handled, detecting the time of day at which the call is placed, detecting language in which the parties to the call are communicating, and/or various other information relating to the call. Various call monitoring techniques now known or later developed may be employed in accordance with embodiments of the present invention. As one example, the monitoring techniques for detecting unauthorized activity and/or other anomalies in a call as described further in concurrently filed and commonly assigned U.S. patent application Ser. No. 11/603,960 titled "SYSTEMS AND METHODS FOR DETECTING A CALL ANOMALY USING BIOMETRIC IDENTIFICATION", the disclosure of which is hereby incorporated herein by reference, may be employed.

Thus, call recording system 14 may capture a recorded call 15. Such recorded call 15 may comprise captured communication during a call (e.g., audio of a telephone call, audio and video of a videoconference, text of a text communication, etc.), and in certain embodiments may also include other call-related data captured by call monitoring logic 13 for the call. The recording 15 may be stored to a computer-readable data storage medium. Such a computer-readable data storage medium may be any suitable computer-readable data storage medium now known or later developed for storing data, including without limitation disk drive, memory (e.g., random access memory (RAM)), floppy disk, optical disk, Compact Disc (CD), Digital Versatile Disc (DVD), and other data storage devices. As described further herein, any of various different forms of storage may be employed for storing recording 15. In certain embodiments, the captured information for a call may be recorded to a protected container (e.g., protected data structure) such as described further in concurrently filed and commonly assigned U.S. patent application Ser. No. 11/603,923 titled "PROTECTED DATA CONTAINER FOR STORING DATA RELATING TO RECORDED CALLS IN A MANNER THAT ENABLES THE DATA TO BE AUTHENTICATED", the disclosure of which is hereby incorporated herein by reference. That is, in certain embodiments, recorded call 15 may be stored to a protected container. Of course, in other embodiments the information recorded for a call may not be so protected or it may be protected using any other techniques now known or later developed.

As further shown in FIG. 1, according to embodiments of the present invention, recording manager 16 is further provided, which is operable to perform score-driven management of the recording 15, as described further herein. Thus, for instance, recording manager 16 is operable to determine (block 101) a score for the recorded call 15 based on call-related events, as described further herein. For instance, as described further below, in certain embodiments a plurality of call-related events may be taken into consideration in computing a score for the recorded call 15. For example, the detection of certain call-related events may increase the score, while the detection of other call-related events may decrease the score; and the resulting final score computed as a result of the various events taken into consideration is utilized for managing the recording 15. As described further below, in certain embodiments, a user (e.g., controlled-environment facility administrator) can select the call-related events to be considered in computing the score, as well as can specify a corresponding impact (e.g., an amount of increase or amount of decrease in value) that each selected call-related event is to have on the computation of the score.

Thus, according to embodiments of the present invention, recording manager 16 is further operable to manage (block 102) handling of recorded call 15 based on the respective score computed for such recorded call 15. As discussed above, once a call is recorded, various management activities for handling of such recording are typically desired, including as examples storing the recording and/or performing post-processing on the recording. That is, once a call is recorded, one must determine what to do with the resulting recording, e.g., where and for how long to store the recording, whether to perform any post-processing activities on the recording and if so, what is the priority of performing such post-processing activities for this recording as compared to other recordings that are to also be processed.

Accordingly, in the exemplary system 10 of FIG. 1, recording manager 16 is operable to manage post-processing of recorded call 15 (e.g., block 103 of FIG. 1) to, for example, select whether to perform any of various post-processing activities 17 and/or to prioritize the performance of such post-processing activities 17 for recorded call 15. Various post-processing activities 17 may be performed on a recording 15, such as having a person manually review the content of the recording (e.g., listen to the captured audio and/or view captured video or text communication), and/or having a keyword search application analyze the captured content for keywords of interest (e.g., audio may be translated to text which is then analyzed by a computer-executable application to detect keywords therein. According to embodiments of the present invention, such post-processing activities are managed for the recorded call 15 based on the score assigned to the recording.

Additionally, in the exemplary system 10 of FIG. 1, recording manager 16 is operable to manage storage options available for storing recorded call 15 (e.g., block 104 of FIG. 1) to, for example, select where and/or length of time for which the recorded call 15 is to be stored. Various storage options 18 may be available, such as temporary, online, near-line, offline, and purge storage options, as discussed further herein. According to embodiments of the present invention, such storage options are managed for the recorded call 15 based on the score assigned to the recording.

While the management activities are shown as functional blocks of recording manager 16 in the example of FIG. 1, in certain embodiments the management activities may be distributed. For instance, recording manager 16 may assign a score to a recording 15 (e.g., block 101 of FIG. 1), and other logic within a system may receive such assigned score for use in managing the recording, such as managing the post-processing activities 17 and/or storage options 18. For instance, a storage management application may receive and utilize such score for managing the storage options 18 for recording 15.

Figure 2:
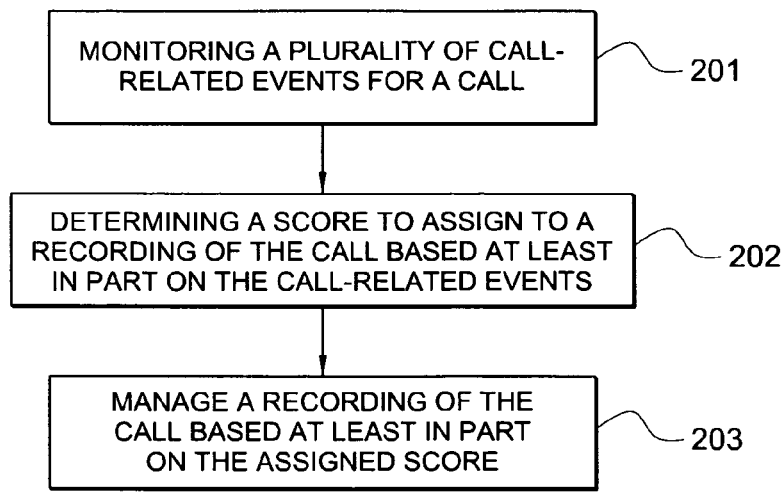
FIG. 2 shows an exemplary operational flow diagram according to one embodiment of the present invention.

FIG. 2 shows an exemplary operational flow diagram according to one embodiment of the present invention. In operational block 201, a plurality of call-related events are monitored for a call. As mentioned above, various information relating to a call may be captured through such monitoring, such as detecting unauthorized call activity (e.g., calls to unauthorized numbers, attempted three-way calls, etc.), detecting the identity of one or more parties to a call (e.g., detecting the identity of a resident of a controlled-environment facility whom is placing the call via, for instance, voice recognition and/or a personal identification number (PIN) input by the resident), detecting a destination number to which the call is directed, detecting from which communication device (e.g., from which telephone) within a controlled-environment facility a call is placed, detecting on which port of the controlled-environment facility's telephone system the call is handled, detecting the time of day at which the call is placed, detecting language in which the parties to the call are communicating, and/or various other information relating to the call.

In block 202, the recording manager determines a score to assign to a recording of the call (e.g., recording 15 of FIG. 1) based at least in part on the monitored call-related events. Thus, as described further herein, embodiments of the present invention enable various call-related events to be taken into consideration in computing a score for a given call.

In block 203, the recording of the call is then managed based at least in part on the recording's assigned score. Thus, score-driven management of the handling of such recording is enabled. For instance, management of post-processing activities and/or storage options for the recording may be performed based on the recording's assigned score. As such, because the score is computed based on various call-related events, the management of the recording may differ depending on the respective call-related events that occur for the call, as described further herein.

Figure 3:
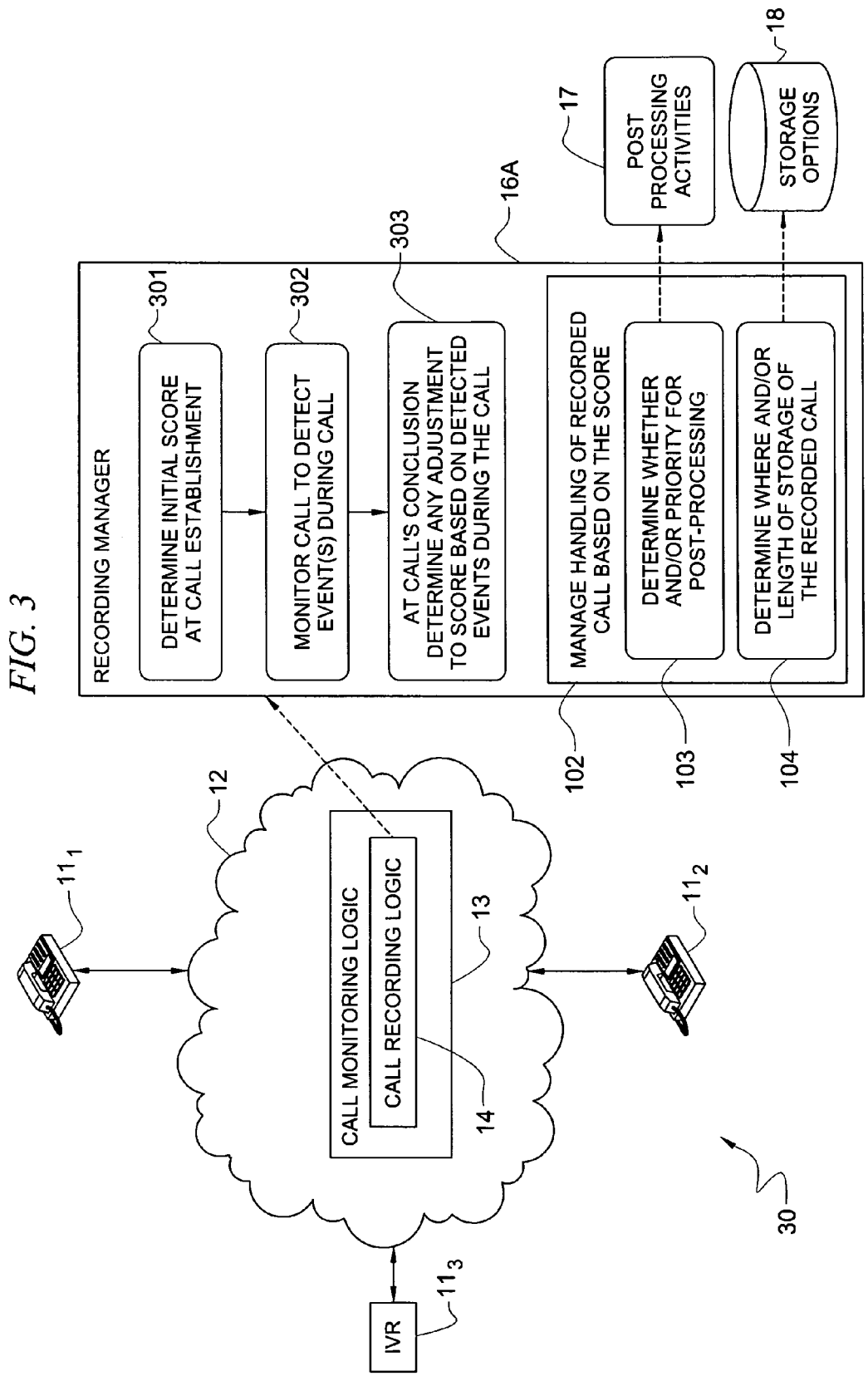
FIG. 3 shows another exemplary system according to one embodiment, in which an initial score is determined and then adjusted based on call-related events detected during the call.

In certain embodiments, an initial score is determined for a call (e.g., at the call's establishment) and then the call is monitored for various call-related events and the initial score is adjusted based on the detected call-related events to arrive at a final score assigned to the call. FIG. 3 shows another exemplary system 30 in which an initial score is determined and then adjusted based on call-related events detected during the call. As with system 10 of FIG. 1, system 30 comprises a first communication device $11_1$ and a second communication device $11_2$, which are operable to communicate with each other. First and second communication devices $11_1$ and $11_2$ are again shown as telephones; although as discussed further herein, embodiments of the present invention are not limited in application to telephony communication devices. Also as with FIG. 1, a further communication device $11_3$ is an interactive voice response (IVR) unit that may participate on a call. Again, while a total of three communication devices $11_1$-$11_3$ are shown for simplicity in this example for participating on a call, any number of communication devices may participate during a given call in certain embodiments, and embodiments of the present invention are not limited as to the number of communication devices that may be participating on a call.

As in system 10 of FIG. 1, the communication devices $11_1$-$11_3$ are communicatively coupled via communication network 12 over which communication of a call is transmitted, which may include (e.g., have communicatively coupled thereto) logic to perform various types of processing on a call. Again, the call processing logic includes call monitoring logic 13 for capturing various data relating to a call. Logic 13 includes a call recording system 14, which, as discussed above, is operable to capture a recording of a call (e.g., recording 15 of FIG. 1).

In this example, an embodiment of recording manager 16, shown as recording manager 16A, is provided, which is operable to perform score-driven management of the recording, as described further herein. In this example, recording manager 16A determines (in block 301) an initial score for a call's recording (e.g., at the time that the call is initiated/established). Thus, for instance, various call-related events may be determined upon a call being initially placed, and those call-related events may be used to determine an initial score for the call. In certain embodiments, all calls for a given controlled-environment facility may have a given initial score (e.g., value "0"). In another embodiment, such call-related events as time of day, identification of the telephone being used to place the call, etc. may affect the initial score assigned to a given call. For example, a controlled-environment facility may establish a rule that takes into consideration various information known at the time of initiating a call in order to compute an initial score for the call.

The recording manager 16A then monitors, operational block 302, the call for event(s) (e.g., receives call-related information detected by call monitoring logic 13) during the call. In operational block 303, the recording manager 16A determines, at the call's conclusion, any adjustment to make to the initial score based on the event(s), if any, detected during the call. The adjusted score is then used by the recording manager 16A in operational block 102 to manage a recording of the call (e.g., to manage post-processing 103 and/or storage 104 of the recording), as discussed above.

Figure 4:
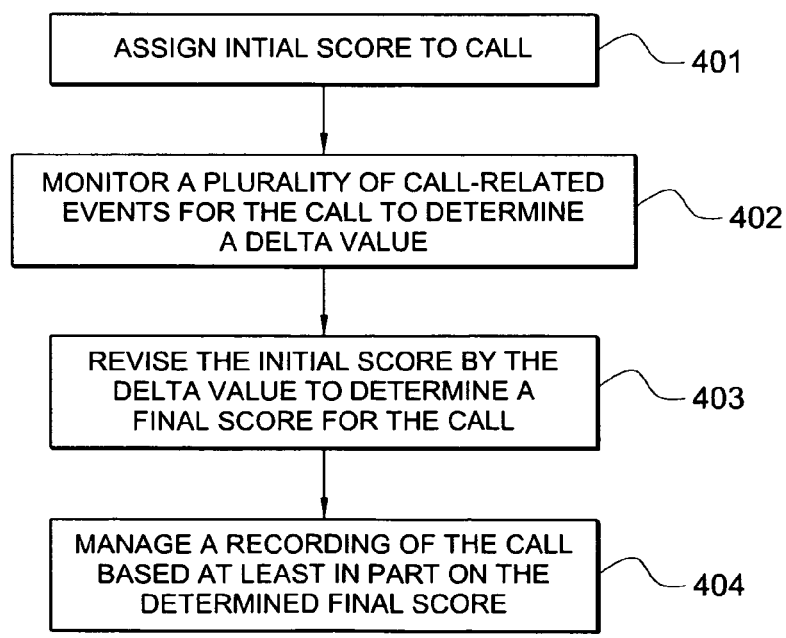
FIG. 4 shows another exemplary operational flow diagram according to one embodiment of the present invention.

FIG. 4 shows another exemplary operational flow diagram according to one embodiment of the present invention. In operational block 401, an initial score is assigned to a call. As mentioned above, such initial score may be assigned to a call at the time of the call being initiated based on information known about the call at that time. In block 402, a plurality of call-related events for the call are monitored. Based on such call-related events a "delta" value (i.e., an amount of adjustment to be applied to the initial score) is determined. In block 403, the initial score is revised by the delta value to determine a final score for the call. In block 404, a recording of the call is managed based at least in part on the determined final score.

Figure 5:
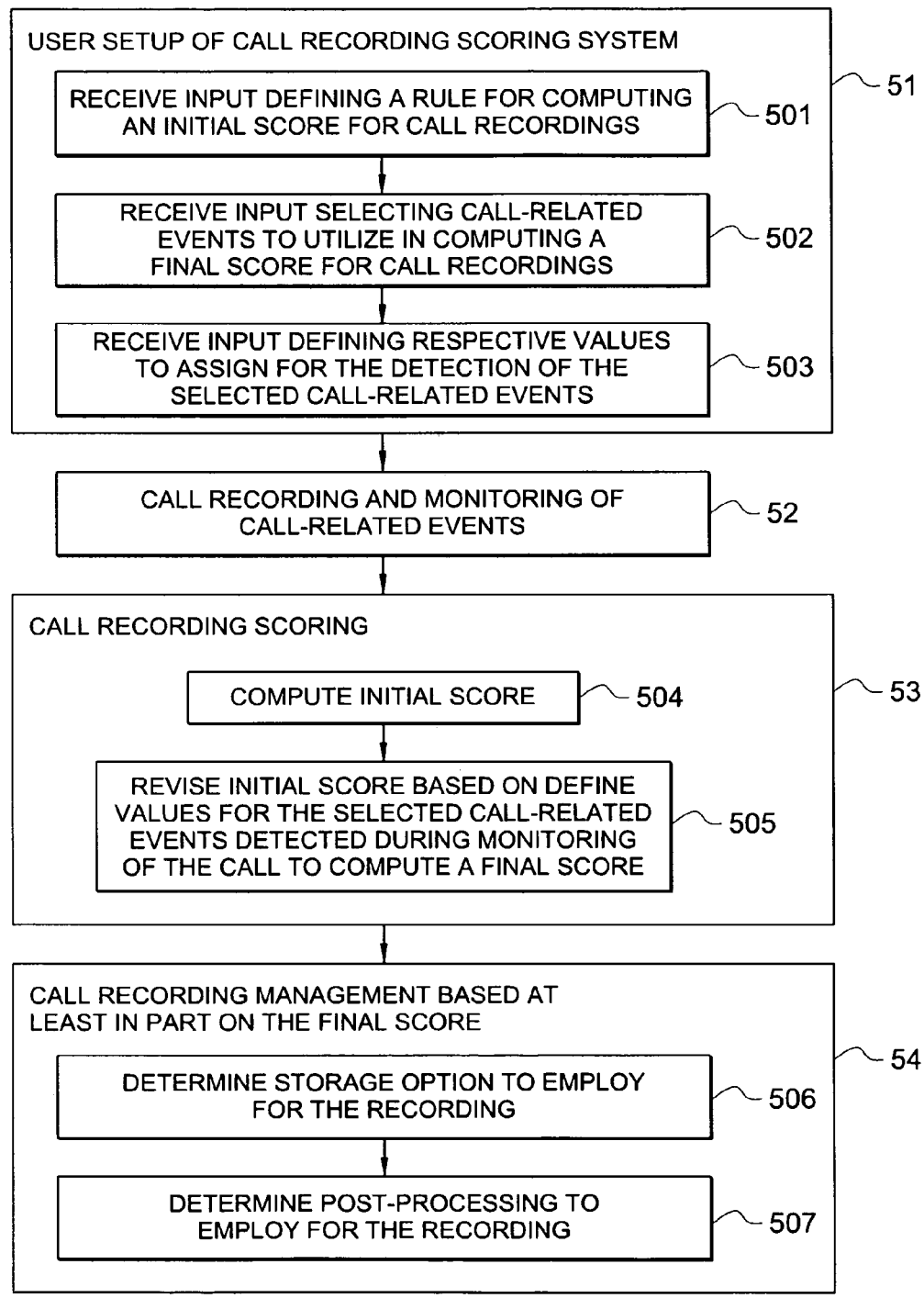
FIG. 5 shows an exemplary operational flow diagram according to one embodiment of the present invention.

In certain embodiments, the scoring computation may be defined by a user, such as by a controlled-environment facility's administrator, in order to score recordings based on call-related events in a manner that the user desires for managing the recordings. FIG. 5 shows an exemplary operational flow diagram according to one embodiment of the present invention. In operational block 51, user setup of the call recording scoring system is performed. For instance, a controlled-environment facility's administrator may interact with a user interface to configure the scoring system in the manner desired. Thus, scores may be assigned to recordings in the manner desired by the administrator so as to enable management of the recordings in a manner desired by the administrator (e.g., to be managed based on the relative weighting of call-related events assigned by the administrator). For instance, in block 501, user input may be received by the recording manager defining a rule for computing an initial score for call recordings. As mentioned above, in certain embodiments, the rule may specify that a given (constant) initial score is assigned to all calls from the facility, or the rule may specify that the initial score is to be determined based on certain information known at the time of call initiation.

Figure 6:
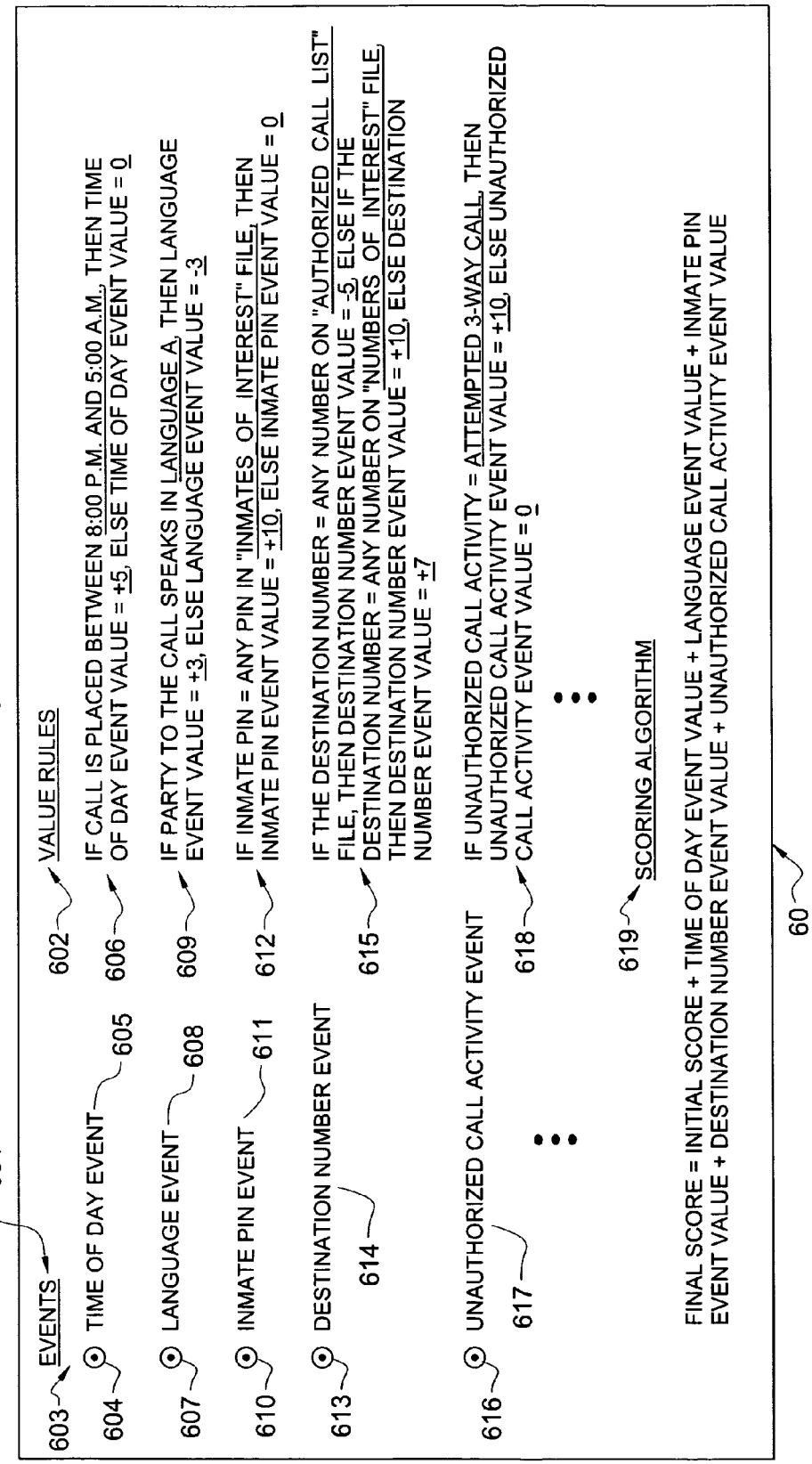
FIG. 6 shows an exemplary user interface that is provided by a recording manager according to one embodiment to enable a user to configure the scoring system.

In block 502, the recording manager receives input selecting call-related events to be utilized in computing a final score for call recordings. As mentioned above, various call-related events may be monitored during a call, and in this embodiment a user (e.g., controlled-environment facility's administrator) may select those call-related events which the user desires for the scoring system to take into consideration in computing a final score for call recordings. In block 503, the recording manager receives input defining respective values to assign for the detection of the selected call-related events. Thus, in this embodiment the user can specify the impact (e.g., whether to increase or decrease the final score and by how much) of detection of each of the selected events during a call. An exemplary interface for selecting the call-related events in block 502 and assigning respective values in block 503 according to one implementation is shown in FIG. 6 described below.

In operational block 52, a call is recorded and monitored for related events. That is, as a call is occurring, monitoring logic 13 monitors the call for various call-related events and recording logic 14 records the content of such call (e.g., audio of a telephony call).

In block 53, scoring of a recording is performed. In this exemplary embodiment, an initial score is computed in operational block 504. In certain embodiments, such an initial score may be computed at the outset of a call based on information known at the outset. In block 505, the initial score is revised based on the values (defined in block 503) for the selected call-related events (selected in block 502) that are detected during monitoring of the call in order to compute a final score for the recording of such call.

In block 54, management of the recording is conducted based at least in part on the assigned final score. For instance, in certain embodiments the storage option to employ for the recording is selected in block 506 based at least in part on the recording's final score. Further, in certain embodiments, post-processing of the recording is managed in block 507 based at least in part on the recording's final score.

FIG. 6 shows an exemplary user interface 60 that is provided by the recording manager according to one embodiment to enable a user (e.g., controlled-environment facility's administrator) to configure the scoring system. Interface 60 presents various events 601 which a user may select to use in computing a score for a recording. In this example, selection buttons (radio buttons) 603 are provided to enable a user to select any of the events 601 that the user desires to include in the score computation. Further, for those events that are selected, the user can define value rules 602 to specify the impact that the corresponding event is to have on the computation of the score. In this example, the user has selected buttons 604, 607, 610, 613, and 616 to select the corresponding events 605, 608, 611, 614, and 617. Further, the user has defined corresponding rules 606, 609, 612, 615, and 618 for the selected events. Further, in this example, the scoring algorithm 619 to be employed for computing a score for recordings of calls is shown to user. In this specific example, the scoring algorithm is "Final Score=Initial Score+Time of Day Event Value+Language Event Value+Inmate PIN Event Value+Destination Number Event Value+Unauthorized Call Activity Event Value." If the user changed the events that are selected for inclusion in the computation of the final score, then the displayed scoring algorithm 619 may be updated accordingly to reflect those event values that are taken into consideration for computing the final score.

In the illustrated example, the user has selected to include Time of Day Event 605 (by selecting button 604) in the score computation. Further, the user has defined a corresponding rule 606 to use for determining a value for this event. In this example, rule 606 is "if call is placed between 8:00 p.m. and 5:00 a.m., then Time of Day Event Value=+5, else Time of Day Event Value=0". In this example, the user interface may allow a user to select various rule formats, such as "if-then" rule formats, and the user then fills in the blanks of the selected rule format, such as the underlined portions of rule 606. Accordingly, in this example, the user selected the rule format and specified that for calls placed between 8:00 p.m. and 5:00 a.m. the Time of Day Event Value is to have a value of "+5", and otherwise the Time of Day Event Value is to have a value of "0". Thus, the user defines how and to what degree the Time of Day Event impacts the computation of the Final Score.

Further, in the illustrated example, the user has selected to include Language Event 608 (by selecting button 607) in the score computation. Further, the user has defined a corresponding rule 609 to use for determining a value for this event. In this example, rule 609 is "if party to the call speaks in Language A, then Language Event Value=+3, else Language Event Value=−3". Thus, in this example, the user selected the "if-then" rule format shown and filled in the underlined portions shown for rule 609 to specify that for calls having a party speaking in "Language A" (which may be English, Spanish, French, Russian, Chinese, etc.) the Language Event Value is to have a value of "+3", and otherwise the Language Value is to have a value of "−3". Accordingly, in this example, the user specifies that if a party speaks in the specified language (Language A), then the Language Event Value impacts the score computation by increasing the score by +3, and otherwise it has an opposite impact of decreasing the score by 3. Thus, the user defines how and to what degree the Language Event impacts the computation of the Final Score.

Further, in the illustrated example, the user has selected to include Inmate PIN Event 611 (by selecting button 610) in the score computation. Further, the user has defined a corresponding rule 612 to use for determining a value for this event. In this example, rule 612 is "if Inmate PIN=any PIN in "Inmates_of_Interest" File, then Inmate PIN Event Value=+ 10, else Inmate PIN Event Value=0". Thus, in this example, the user selected the "if-then" rule format shown and filled in the underlined portions shown for rule 612 to specify that for calls placed by an inmate that corresponds to any inmates listed in the "Inmates_of_Interest" file the Inmate PIN Event Value is to have a value of "+10", and otherwise the Inmate PIN Event Value is to have a value of "0". Thus, the user defines how and to what degree the Inmate PIN Event impacts the computation of the Final Score.

Further, in the illustrated example, the user has selected to include Destination Number Event 614 (by selecting button 613) in the score computation. Further, the user has defined a corresponding rule 615 to use for determining a value for this event. In this example, rule 615 is "if the destination number=any number on "authorized_call_list" file, then Destination Number Event Value=−5, else if the destination number=any number on "numbers_of_interest" file, then Destination Number Event Value=+10, else Destination Number Event Value=+7". Thus, in this example, the user selected the "if-then" rule format shown and filled in the underlined portions shown for rule 615 to specify that for calls placed to any number on an authorized call list for an inmate the Destination Number Event Value is to have a value of "−5"; for calls placed to any number on the numbers of interest file, the Destination Number Event Value is to have a value of "+10"; and otherwise the Destination Number Event Value is to have a value of "+7". Accordingly, for those calls to the destination numbers that are authorized for an inmate (in the "authorized_call_list" file), the Destination Number Event Value reduces the score by −5 (i.e., these recordings may be of less interest for future processing, etc.). For those calls to numbers that are of interest (e.g., to suspected partners in crime, etc.) identified in the "numbers_of_interest" file, the Destination Number Event Value increases the score by +10 (i.e., these recordings may be of greater interest for future processing, etc.). And, for those call to numbers that are not listed as being of interest but are also not listed as authorized, then the Destination Number Event Value increases the score by +7 because this factor indicates that these recordings may be somewhat of interest for future processing, etc. Thus, the user defines how and to what degree the Destination Number Event impacts the computation of the Final Score.

Further still, in the illustrated example, the user has selected to include Unauthorized Call Activity Event 617 (by selecting button 616) in the score computation. Further, the user has defined a corresponding rule 618 to use for determining a value for this event. In this example, rule 618 is "if unauthorized call activity=attempted 3-way call, then Unauthorized Call Activity Event Value=+10, else Unauthorized Call Activity Event Value=0". Thus, in this example, the user selected the "if-then" rule format shown and filled in the underlined portions shown for rule 618 to specify that for calls for which an attempted 3-way call is detected the Unauthorized Call Activity Event Value is to have a value of "+10", and otherwise the Unauthorized Call Activity Event Value is to have a value of "0". In certain embodiments, the user may select one or more of various different unauthorized call activities instead of or in addition to the "attempted 3-way call" selected in the example of FIG. 6. For instance, in certain implementations a drop-down box may be provided that enables a user to select any of various different types of unauthorized call activities to use the computation of the score. Thus, the user defines how and to what degree the Unauthorized Call Activity Event impacts the computation of the Final Score.

Various other types of events in addition to or instead of those exemplary events 601 shown in FIG. 6 may be available for selection by a user for inclusion in the scoring algorithm 619. Further, various other rules in addition to or instead of those exemplary rules 602 shown in FIG. 6 for determining a respective value for a selected event may be defined by a user for use in determining the values used in scoring algorithm 619 for a given call.

Figure 7:
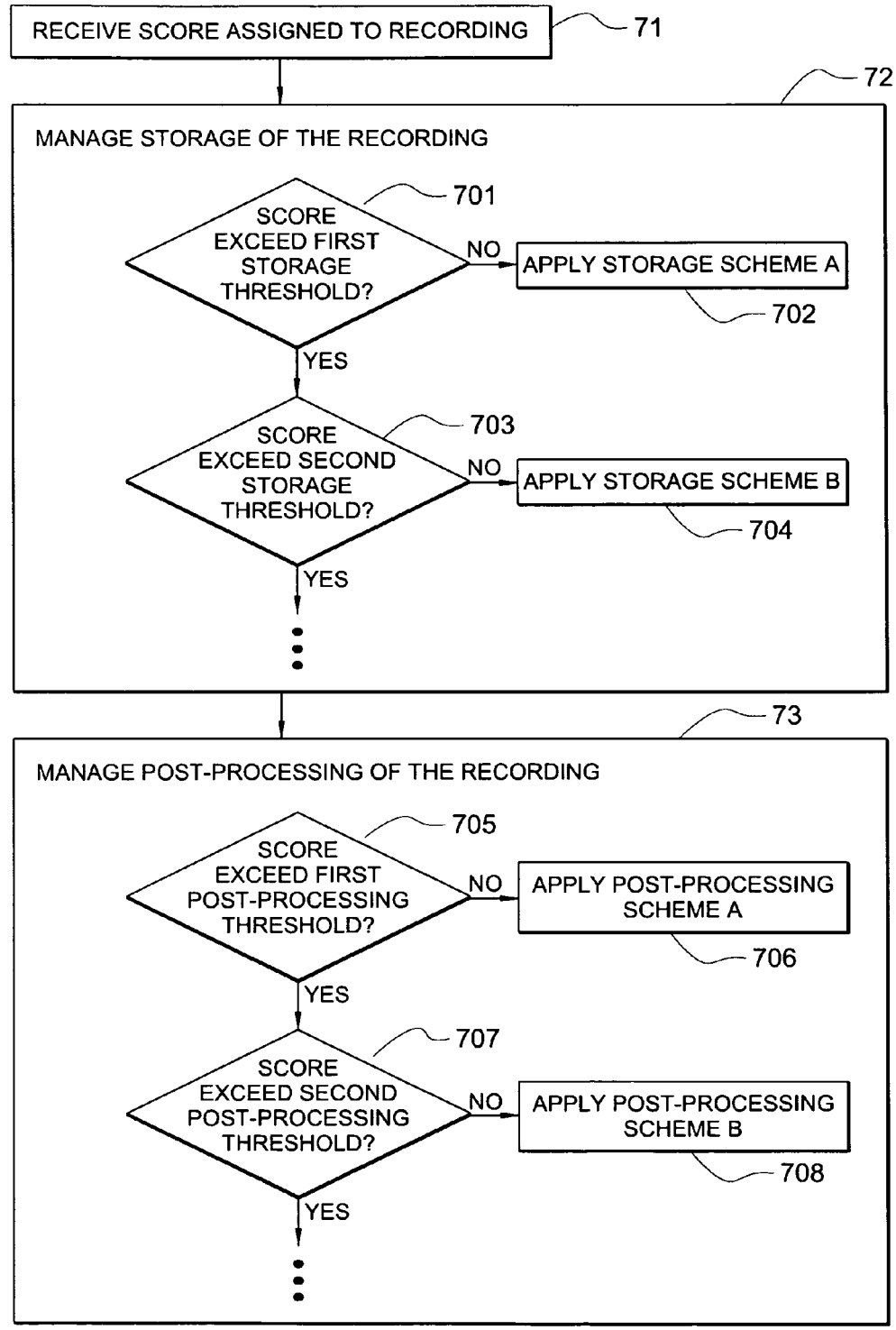
FIG. 7 shows an exemplary operational flow diagram for score-drive management of a recording according to one embodiment of the present invention.

FIG. 7 shows an exemplary operational flow diagram for score-drive management of a recording according to one embodiment of the present invention. In operational block 71, a management application receives a score that is assigned to the recording. Such a score may be computed as described above. In block 72, storage of the recording may be managed. For instance, in this example, a storage management application may determine in block 701 whether the score assigned to the recording exceeds a first storage threshold value, which may be defined, for example, by a user (e.g., a controlled-environment facility's administrator). If the score does not exceed the first threshold value, then a first storage scheme (Scheme A) is applied in block 702. Such a storage scheme A may specify where to store the recording and for how long. For instance, storage scheme A may specify to store the recording for 90 days in online storage and then move the recording to offline storage for a period of 2 years. If the score does exceed the first threshold value, then operation advances from block 701 to block 703 whereat the storage management application determines whether the score assigned to the recording exceeds a second storage threshold value (e.g., a threshold greater than the first threshold), which may be defined, for example, by a user (e.g., a controlled-environment facility's administrator). If the score exceeds the first threshold value but does not exceed the second threshold value, then a second storage scheme (Scheme B) is applied in block 704. Such a storage scheme B may specify where to store the recording and for how long. For instance, storage scheme B may specify to store the recording for 150 days in online storage and then move the recording to offline storage for a period of 4 years. Any number of different threshold values may be set with corresponding storage schemes to apply using this type of score-drive management of recordings.

In block 73, post-processing of the recording may be managed. For instance, in this example, a post-processing management application may determine in block 705 whether the score assigned to the recording exceeds a first post-processing threshold value, which may be defined, for example, by a user (e.g., a controlled-environment facility's administrator). If the score does not exceed the first threshold value, then a first post-processing scheme (Scheme A) is applied in block 706. Such a post-processing scheme A may specify which and how urgent (e.g., a prioritization) post-processing activities should be applied to the recording. For instance, post-processing scheme A may specify that the recording is to be flagged to be processed by a keyword search algorithm within 150 days. If the score does exceed the first threshold value, then operation advances from block 705 to block 707 whereat the post-processing management application determines whether the score assigned to the recording exceeds a second post-processing threshold value (e.g., a threshold greater than the first threshold), which may be defined, for example, by a user (e.g., a controlled-environment facility's administrator). If the score exceeds the first threshold value but does not exceed the second threshold value, then a second post-processing scheme (Scheme B) is applied in block 708. Such a post-processing scheme B may specify which and how urgent (e.g., a prioritization) post-processing activities should be applied to the recording. For instance, post-processing scheme B may specify that the recording is to be urgently (e.g., immediately) processed by a keyword search algorithm and is to be flagged for review by a human (e.g., to manually review the content of the recording and/or the results of the keyword search algorithm) within 30 days. Any number of different threshold values may be set with corresponding post-processing schemes to apply using this type of score-drive management of recordings.

In certain embodiments, the score assigned to a recording may be later revised after certain post-processing activities have occurred. For instance, based on a keyword search by a computer-executable keyword searching application on a recording, the score may be heightened or lowered. For instance, if keywords of interest are found, the score may be increased to give a higher priority for further post-processing, such as manual review of the recoding by an investigator, etc. On the other hand, if keywords of interest are not found, then the score assigned to the recording may be decreased to give a lower priority for further post-processing.

FIG. 8 shows an exemplary system 80 according to one embodiment of the present invention, wherein a score-driven management technique is employed for managing recordings of calls for a controlled-environment facility 800. As with the example of FIG. 1, communication devices $11_1$-$11_3$ are communicatively coupled via communication network 12, which includes call monitoring logic 13 having call recording logic 14 for recording calls resulting in recordings, such as recording 15. Also, as described with FIG. 1, recording manager 16 is again provided for determining (in block 101) a score for the recording based on call-related events. Further, exemplary implementations of storage options, such as storage options 18A, and post-processing activities, shown as post-processing activities 17A, are shown.

In this example, telephone $11_1$ is implemented within controlled-environment facility 800 for use by residents of the facility to communicate with other parties, such as a party using external telephone $11_2$. Various elements shown in this example may be implemented within the controlled-environment facility 800, external to the facility, and/or distributed so as to be partially in and partially external to the facility. Further, the elements may be distributed among a plurality of computer systems, whether implemented fully in, fully out, or partially in and partially out of the facility. In the illustration of FIG. 8, call monitoring logic 13 (including recording logic 14), recording manager 16 (and the elements thereof), post-processing activities 17A, and storage options 18A are each shown arranged on the dashed line that designates controlled-environment facility 800, as each of these elements may be implemented in whole or in part internal or external to controlled-environment facility 800. For instance, in certain embodiments, these elements may be implemented in a central server that monitors calls for one or more controlled-environment facilities, such as controlled-environment facility 800. The various elements may be communicatively coupled via a communication network, such as a PSTN, wireless network, the Internet, etc., using well-known networking techniques.

In the exemplary system 80 of FIG. 8, storage options 18A include a multi-stage storage system having such stages (or partitions) as temporary storage 801, online storage 802, near-line storage 803, offline storage 804, and purged 805. Further, in this example, a storage management application 806 is provided, which manages storage of recordings, such as recording 15, to the various stages of storage. That is, storage management application 806 manages to which stage and for how long a given recording is to be stored. As described further herein, storage management application 806 may perform such management based on a score assigned to the recording 15.

Additionally, in the exemplary system 80 of FIG. 8, post-processing activities 17A include a manual review 807 of a recording (e.g., a human user manually reviews the content of a recorded call) and a keyword search application 808 that is a computer-executable application operable to detect keywords of interest in a recording. Further, in this example, a post-processing management application 809 is provided, which manages post-processing of recordings, such as recording 15. That is, post-processing management application 809 manages which of the post-processing activities 807 and 808 are to be performed for a given recording, as well as the relative priority of performing such post-processing activity(ies) for the recording as compared to other recordings. As described further herein, post-processing management application 809 may perform such management based on a score assigned to the recording 15.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    assigning an initial numerical score to a recording of a call between a calling party and a called party;
    modifying the initial numerical score into a final numerical score based, at least in part, upon a call-related event detected during a monitoring of the call, the call-related event causing the initial numerical score to be increased or decreased by a predetermined amount; and
    selecting, among two or more different types of storage, a given type of storage where to store the recording based, at least in part, upon the final numerical score.

2. The method of claim 1, wherein the calling party is resident of a correctional facility and the called party is a non-resident of the correctional facility.

3. The method of claim 1, wherein the call-related event detected during the monitoring of the call includes an attempted initiation of a three-way call.

4. The method of claim 1, wherein the call-related event detected during the monitoring of the call includes a change in a number of unique voices participating on the call.

5. The method of claim 1, wherein the call-related event detected during the monitoring of the call includes a language spoken by one or more parties to the call.

6. The method of claim 1, wherein the call-related event detected during the monitoring of the call includes a manual flagging of the call as being of interest by a person monitoring the call.

7. The method of claim 1, wherein the two or more different types of storage are selected from the group consisting of: a temporary type of storage, an online type of storage, a near-line type of storage, and an offline type of storage.

8. The method of claim 1, further comprising selecting a length of time during which to store the recording based, at least in part, upon the final numerical score.

9. The method of claim 1, further comprising selecting a first length of time during which to store the recording in a first type of storage and a second length of time during which to store the recording in a second type of storage based, at least in part, upon the final numerical score.

10. The method of claim 1, further comprising selecting between manual analysis and automated keyword detection to process the recording based, at least in part, upon the final numerical score.

11. The method of claim 1, further comprising prioritizing a review of the recording among other recordings based, at least in part, upon the final numerical score.

12. The method of claim 1, wherein the call-related event detected during the monitoring of the call includes a predefined word spoken by one or more parties to the call.

13. A method comprising:
assigning an initial numerical score to a recording of a call between a calling party and a called party;
modifying the initial numerical score into a final numerical score based, at least in part, upon a call-related event detected during a monitoring of the call, the call-related event causing the initial numerical score to be increased or decreased by a predetermined amount; and
selecting a length of time during which to store the recording based, at least in part, upon the final numerical score.

14. The method of claim 13, wherein the calling party is resident of a correctional facility and the called party is a non-resident of the correctional facility.

15. The method of claim 13, wherein the call-related event detected during the monitoring of the call includes an attempted initiation of a three-way call.

16. The method of claim 13, wherein the call-related event detected during the monitoring of the call includes a change in a number of unique voices participating on the call.

17. The method of claim 13, wherein the call-related event detected during the monitoring of the call includes a language spoken by one or more parties to the call.

18. The method of claim 13, wherein the call-related event detected during the monitoring of the call includes a manual flagging of the call as being of interest by a person monitoring the call.

19. The method of claim 13, further comprising selecting, among two or more different types of storage, a given type of storage where to store the recording based, at least in part, upon the final numerical score.

20. The method of claim 19, wherein the two or more different types of storage are selected from the group consisting of: a temporary type of storage, an online type of storage, a near-line type of storage, and an offline type of storage.

21. The method of claim 13, further comprising selecting a first length of time during which to store the recording in a first type of storage and a second length of time during which to store the recording in a second type of storage based, at least in part, upon the final numerical score.

22. The method of claim 13, further comprising selecting between manual analysis and automated keyword detection to process the recording based, at least in part, upon the final numerical score.

23. The method of claim 13, further comprising prioritizing a review of the recording among other recordings based, at least in part, upon the final numerical score.

24. The method of claim 13, wherein the call-related event detected during the monitoring of the call includes a predefined word spoken by one or more parties to the call.

25. A method comprising:
assigning an initial numerical score to a recording of a call between a calling party and a called party;
modifying the initial numerical score into a final numerical score based, at least in part, upon a call-related event detected during a monitoring of the call, the call-related event causing the initial numerical score to be increased or decreased by a predetermined amount; and
selecting between manual analysis and automated keyword detection to process the recording based, at least in part, upon the final numerical score.

26. The method of claim 25, wherein the calling party is resident of a correctional facility and the called party is a non-resident of the correctional facility.

27. The method of claim 25, wherein the call-related event detected during the monitoring of the call includes an attempted initiation of a three-way call.

28. The method of claim 25, wherein the call-related event detected during the monitoring of the call includes a change in a number of unique voices participating on the call.

29. The method of claim 25, wherein the call-related event detected during the monitoring of the call includes a language spoken by one or more parties to the call.

30. The method of claim 25, wherein the call-related event detected during the monitoring of the call includes a manual flagging of the call as being of interest by a person monitoring the call.

31. The method of claim 25, further comprising selecting, among two or more different types of storage, a given type of storage where to store the recording based, at least in part, upon the final numerical score.

32. The method of claim 31, wherein the two or more different types of storage are selected from the group consisting of: a temporary type of storage, an online type of storage, a near-line type of storage, and an offline type of storage.

33. The method of claim 25, further comprising selecting a length of time during which to store the recording based, at least in part, upon the final numerical score.

34. The method of claim 25, further comprising selecting a first length of time during which to store the recording in a first type of storage and a second length of time during which to store the recording in a second type of storage based, at least in part, upon the final numerical score.

35. The method of claim 25, further comprising prioritizing a review of the recording among other recordings based, at least in part, upon the final numerical score.

36. A method comprising:
assigning an initial numerical score to a recording of a call between a calling party and a called party;
modifying the initial numerical score into a final numerical score based, at least in part, upon a call-related event detected during a monitoring of the call, the call-related event causing the initial numerical score to be increased or decreased by a predetermined amount; and
prioritizing a review of the recording among other recordings based, at least in part, upon the final numerical score.

37. The method of claim 36, wherein the calling party is resident of a correctional facility and the called party is a non-resident of the correctional facility.

38. The method of claim 36, wherein the call-related event detected during the monitoring of the call includes an attempted initiation of a three-way call.

39. The method of claim 36, wherein the call-related event detected during the monitoring of the call includes a change in a number of unique voices participating on the call.

40. The method of claim 36, wherein the call-related event detected during the monitoring of the call includes a language spoken by one or more parties to the call.

41. The method of claim 36, wherein the call-related event detected during the monitoring of the call includes a manual flagging of the call as being of interest by a person monitoring the call.

42. The method of claim 36, further comprising selecting, among two or more different types of storage, a given type of storage where to store the recording based, at least in part, upon the final numerical score.

43. The method of claim 42, wherein the two or more different types of storage are selected from the group consisting of: a temporary type of storage, an online type of storage, a near-line type of storage, and an offline type of storage.

44. The method of claim 36, further comprising selecting a length of time during which to store the recording based, at least in part, upon the final numerical score.

45. The method of claim 36, further comprising selecting a first length of time during which to store the recording in a first type of storage and a second length of time during which to store the recording in a second type of storage based, at least in part, upon the final numerical score.

46. A system comprising:
a call recording module configured to record a call between a resident of a correctional facility and a non-resident of the correctional facility;
a call monitoring module coupled to the call recording module, the call monitoring module configured to detect a call-related event during a monitoring of the call; and
a recording manager module coupled to the call monitoring module, the recording manager module configured to assign an initial numerical score to the recording at an initiation of the call and to modify the initial numerical score into a final numerical score during the monitoring of the call based, at least in part, on a numerical value associated with the call-related event, the recording manager module further configured to:
select, among two or more different types of storage, a given type of storage where to store the recording based, at least in part, upon the final numerical score;
select a length of time during which to store the recording based, at least in part, upon the final numerical score;
select between manual analysis and automated keyword detection to process the recording based, at least in part, upon the final numerical score; or
prioritize a review of the recording among other recordings based, at least in part, upon the final numerical score.

47. The system of claim 46, wherein the call-related event detected during the monitoring of the call includes an attempted initiation of a three-way call.

48. The system of claim 46, wherein the call-related event detected during the monitoring of the call includes a change in a number of unique voices participating on the call.

49. The system of claim 46, wherein the call-related event detected during the monitoring of the call includes a language spoken by one or more parties to the call.

50. The system of claim 46, wherein the call-related event detected during the monitoring of the call includes a manual flagging of the call as being of interest by a person monitoring the call.

51. The system of claim 46, wherein the two or more different types of storage are selected from the group consisting of: a temporary type of storage, an online type of storage, a near-line type of storage, and an offline type of storage.

52. The system of claim 46, further comprising selecting a first length of time during which to store the recording in a first type of storage and a second length of time during which to store the recording in a second type of storage based, at least in part, upon the final numerical score.

* * * * *